US012763339B2

(12) United States Patent
Muramatsu et al.

(10) Patent No.: US 12,763,339 B2
(45) Date of Patent: Oct. 13, 2026

(54) CELL, CELL STACK DEVICE, MODULE, AND MODULE HOUSING DEVICE

(71) Applicant: KYOCERA Corporation, Kyoto (JP)

(72) Inventors: Hiroki Muramatsu, Kirishima (JP); Akihiro Hara, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 652 days.

(21) Appl. No.: 18/032,780

(22) PCT Filed: Oct. 28, 2021

(86) PCT No.: PCT/JP2021/039906
§ 371 (c)(1),
(2) Date: Apr. 19, 2023

(87) PCT Pub. No.: WO2022/092235
PCT Pub. Date: May 5, 2022

(65) Prior Publication Data
US 2023/0387422 A1 Nov. 30, 2023

(30) Foreign Application Priority Data
Oct. 30, 2020 (JP) ................................ 2020-183197

(51) Int. Cl.
*H01M 4/90* (2006.01)
*H01M 4/86* (2006.01)
*H01M 8/12* (2016.01)
*H01M 8/1213* (2016.01)
*H01M 8/1246* (2016.01)
(Continued)

(52) U.S. Cl.
CPC ......... *H01M 4/905* (2013.01); *H01M 4/8652* (2013.01); *H01M 8/1213* (2013.01); *H01M 8/1246* (2013.01); *H01M 8/2475* (2013.01); *H01M 2004/8684* (2013.01);
(Continued)

(58) Field of Classification Search
CPC .. H01M 4/905; H01M 4/8652; H01M 8/1213; H01M 8/2475; H01M 8/243; H01M 2004/8684; H01M 2008/1293; H01M 2300/0074; H01M 8/246; H01M 8/1246; Y02E 60/50
See application file for complete search history.

(56) References Cited

U.S. PATENT DOCUMENTS

2016/0164108 A1 6/2016 Matsuno et al.
2018/0301715 A1* 10/2018 Takahashi ........... H01M 8/0252
2020/0153019 A1* 5/2020 Yamada .............. H01M 8/1213

FOREIGN PATENT DOCUMENTS

JP 2005-166314 A 6/2005
JP 2010-231918 A 10/2010
(Continued)

*Primary Examiner* — Eugenia Wang
(74) *Attorney, Agent, or Firm* — Procopio, Cory, Hargreaves & Savitch LLP

(57) ABSTRACT

A cell includes an air electrode layer, a fuel electrode layer, and a solid electrolyte layer. The fuel electrode layer contains a first rare earth element and a second rare earth element different from the first rare earth element. The solid electrolyte layer is located between the air electrode layer and the fuel electrode layer, and contains the second rare earth element. The fuel electrode layer has a first site and a second site. The second site is located between the first site and the solid electrolyte layer, and contains at least the second rare earth element.

12 Claims, 17 Drawing Sheets

(51) Int. Cl.
*H01M 8/2475* (2016.01)
*H01M 8/243* (2016.01)

(52) U.S. Cl.
CPC .... *H01M 2008/1293* (2013.01); *H01M 8/243* (2013.01); *H01M 2300/0074* (2013.01)

(56) References Cited

FOREIGN PATENT DOCUMENTS

| | | | | | |
|---|---|---|---|---|---|
| JP | 2015-35416 | A | | 2/2015 | |
| WO | WO-2018235467 | A1 | * | 12/2018 | .......... H01M 8/2425 |

* cited by examiner

CELL, CELL STACK DEVICE, MODULE, AND MODULE HOUSING DEVICE

CROSS-REFERENCE TO RELATED APPLICATIONS

This application is national stage application of International Application No. PCT/JP2021/039906, filed on Oct. 28, 2021, which designates the United States, incorporated herein by reference, and which claims the benefit of priority from Japanese Patent Application No. 2020-183197, filed on Oct. 30, 2020, the entire contents of which are incorporated herein by reference.

TECHNICAL FIELD

The present disclosure relates to a cell, a cell stack device, a module, and a module housing device.

BACKGROUND OF INVENTION

In recent years, various fuel cell stack devices each including a plurality of fuel cells have been proposed as next-generation energy sources. A fuel cell is a type of cell capable of obtaining electrical power by using a fuel gas such as a hydrogen-containing gas and an oxygen-containing gas such as air.

CITATION LIST

Patent Literature

Patent Document 1: JP 2015-35416 A

SUMMARY

In an aspect of an embodiment, a cell includes an air electrode layer, a fuel electrode layer, and a solid electrolyte layer. The fuel electrode layer contains a first rare earth element and a second rare earth element different from the first rare earth element. The solid electrolyte layer is located between the air electrode layer and the fuel electrode layer, and contains the second rare earth element. The fuel electrode layer has a first site and a second site. The second site is located between the first site and the solid electrolyte layer and contains at least the second rare earth element.

A cell stack device of the present disclosure includes a cell stack including at least one of the cells mentioned above.

A module of the present disclosure includes the cell stack device mentioned above and a storage container that houses the cell stack device.

A module housing device of the present disclosure includes the module mentioned above, an auxiliary device for operating the module, and an external case that houses the module and the auxiliary device.

DESCRIPTION OF EMBODIMENTS

Hereinafter, embodiments of a cell, a cell stack device, a module, and a module housing device disclosed in the present application will be described in detail with reference to the accompanying drawings. The present invention is not limited by the following embodiments.

Note that the drawings are schematic and that the dimensional relationships between elements, the proportions thereof, and the like may differ from the actual ones. There may be differences between the drawings in the dimensional relationships, proportions, and the like.

First Embodiment

Configuration of Cell

First, with reference to FIG. 1A to FIG. 1C, an example of a solid oxide type fuel cell will be described as a cell according to a first embodiment.

Figure 1A:
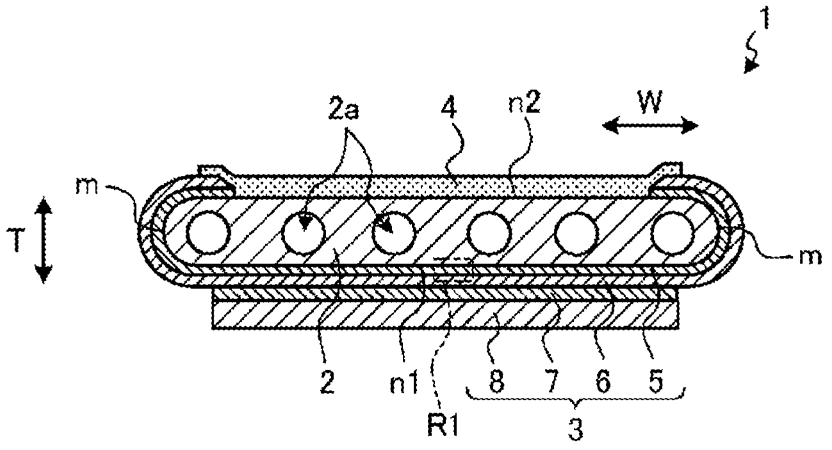
FIG. 1A is a horizontal cross-sectional view illustrating an example of a cell according to a first embodiment.
Figure 1B:
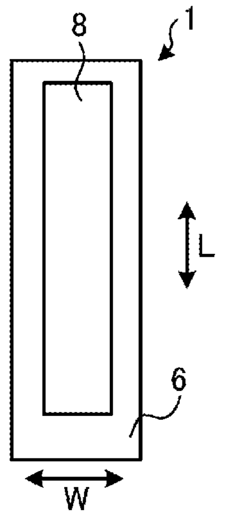
FIG. 1B is a side view of the example of the cell according to the first embodiment when viewed from a side of an air electrode layer.
Figure 1C:
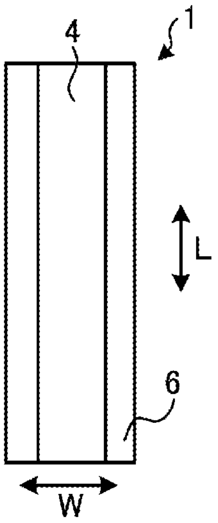
FIG. 1C is a side view of the example of the cell according to the first embodiment when viewed from a side of an interconnector.

FIG. 1A is a horizontal cross-sectional view illustrating an example of a cell 1 according to the first embodiment, FIG. 1B is a side view of the example of the cell 1 according to the first embodiment when viewed from a side of an air electrode layer, and FIG. 1C is a side view of the example of the cell 1 according to the first embodiment when viewed from a side of an interconnector. Note that FIGS. 1A to 1C each illustrate an enlarged portion of a configuration of the cell 1.

In the example illustrated in FIGS. 1A to 1C, the cell 1 is hollow and flat plate-shaped, and has an elongated plate shape. As illustrated in FIG. 1B, the overall shape of the cell 1 when viewed from the side is, for example, a rectangle having a side length of from 5 cm to 50 cm in a length direction L and a length of from 1 cm to 10 cm in a width direction W orthogonal to the length direction L. The thickness in a thickness direction T of the entire cell 1 is, for example, from 1 mm to 5 mm.

As illustrated in FIG. 1A, the cell 1 includes a support substrate 2 with electrical conductivity, an element portion 3, and an interconnector 4. The support substrate 2 has a pillar shape with a pair of opposing flat surfaces n1, n2 and a pair of side surfaces m in a circular arc shape connecting the flat surfaces n1, n2.

The element portion 3 is located on the flat surface n1 of the support substrate 2. The element portion 3 includes a fuel electrode layer 5, a solid electrolyte layer 6, and an air electrode layer 8. In the example illustrated in FIG. 1A, the interconnector 4 is located on the flat surface n2 of the cell 1. The cell 1 may include an intermediate layer 7 between the solid electrolyte layer 6 and the air electrode layer 8.

As illustrated in FIG. 1B, the air electrode layer 8 does not extend to the lower end of the cell 1. At the lower end portion of the cell 1, only the solid electrolyte layer 6 is exposed on a surface of the flat surface n1. As illustrated in FIG. 1C, the interconnector 4 may extend to the lower end of the cell 1. At a lower end portion of the cell 1, the interconnector 4 and the solid electrolyte layer 6 are exposed on the surface. As illustrated in FIG. 1A, the solid electrolyte layer 6 is exposed at the surface at the pair of side surfaces m in a circular arc shape of the cell 1. The interconnector 4 need not extend to the lower end of the cell 1.

Hereinafter, each of constituent members constituting the cell 1 will be described.

The support substrate 2 includes gas-flow passages 2*a*, in which gas flows. The example of the support substrate 2 illustrated in FIG. 1A includes six gas-flow passages 2*a*. The support substrate 2 has gas permeability and allows a fuel gas flowing through the gas-flow passages 2*a* to pass through to the fuel electrode layer 5. The support substrate 2 may have electrical conductivity. The support substrate 2 having electrical conductivity collects electricity generated in the element portion 3 to the interconnector 4.

The material of the support substrate 2 includes, for example, an iron group metal component and an inorganic oxide. For example, the iron group metal component is, for example, Ni (nickel) and/or NiO. The inorganic oxide may be, for example, a specific rare earth element oxide. The rare earth element oxide may contain, for example, one or more rare earth elements selected from Sc, Y, La, Nd, Sm, Gd, Dy, and Yb.

As the material of the fuel electrode layer 5, a commonly known material may be used. The fuel electrode layer 5 may use a porous electrically conductive ceramic, for example, a ceramic containing an ion conductive material such as $ZrO_2$ in which a rare earth element oxide is in solid solution, and also containing Ni and/or NiO. The above rare earth element oxide contains a plurality of rare earth elements selected from, for example, Sc, Y, La, Nd, Sm, Gd, Dy, and Yb. Hereinafter, $ZrO_2$ in which a rare earth element oxide is in solid solution may be referred to as stabilized zirconia. Stabilized zirconia also includes partially stabilized zirconia. Details of the fuel electrode layer 5 will be described later.

The solid electrolyte layer 6 is an electrolyte and serves as a bridge for ions between the fuel electrode layer 5 and the air electrode layer 8. At the same time, the solid electrolyte layer 6 has gas blocking properties, and makes leakage of the fuel gas and the oxygen-containing gas less likely to occur.

The material of the solid electrolyte layer 6 may be, for example, an ion conductive material such as $ZrO_2$ in which, for example, a 3-mol % to 15-mol % rare earth element oxide is in solid solution. The rare earth element oxide may contain, for example, one or more rare earth elements selected from Sc, La, Nd, Gd, and Yb. Hereinafter, a material in which a rare earth element oxide is in solid solution may be simply referred to as a material in which a rare earth element is in solid solution. The solid electrolyte layer 6 may contain, for example, $ZrO_2$ in which Yb, Sc, or Gd is in solid solution, $CeO_2$ in which La, Nd, or Yb is in solid solution, $BaZrO_3$ in which Sc or Yb is in solid solution, or $BaCeO_3$ in which Sc or Yb is in solid solution. The solid electrolyte layer 6 includes a material in which a second rare earth element is in solid solution. In other words, the rare earth element that is in solid solution in the ion conductive material contained in the solid electrolyte layer 6 is a second rare earth element.

The air electrode layer 8 has gas permeability. The open porosity (void ratio) of the air electrode layer 8 may be, for example, in a range from 20% to 50%, and particularly may be in a range from 30% to 50%.

The material of the air electrode layer 8 is not particularly limited as long as the material is commonly used for the air electrode. The material of the air electrode layer 8 may be, for example, an electrically conductive ceramic such as a so-called $ABO_3$ type perovskite-type oxide.

The material of the air electrode layer 8 may be, for example, a composite oxide in which Sr (strontium) and La (lanthanum) coexist in the A-site. Examples of such a composite oxide include $La_xSr_{1-x}Co_yFe_{1-y}O_3$, $La_xSr_{1-x}MnO_3$, $La_xSr_{1-x}FeO_3$, and $La_xSr_{1-x}CoO_3$. Here, x is $0<x<1$, and y is $0<y<1$.

When the element portion 3 has the intermediate layer 7, the intermediate layer 7 functions as a diffusion prevention layer. The intermediate layer 7 makes Sr (strontium) contained in the air electrode layer 8 less likely to diffuse into the solid electrolyte layer 6 containing Zr, for example, thereby making a resistive layer of $SrZrO_3$ less likely to be formed in the solid electrolyte layer 6.

The material of the intermediate layer 7 is not particularly limited as long as it is generally used for the diffusion prevention layer of Sr. The material of the intermediate layer 7 may contain, for example, $CeO_2$ (cerium oxide) in which rare earth elements other than Ce (cerium) are in solid solution. As such rare earth elements, for example, Gd (gadolinium), Sm (samarium), or the like may be used.

The interconnector 4 is dense, and makes the leakage of the fuel gas flowing through the gas-flow passages 2*a* located inside the support substrate 2, and of the oxygen-containing gas flowing outside the support substrate 2 less likely to occur. The interconnector 4 may have a relative density of 93% or more; particularly 95% or more.

The material of the interconnector 4 may be a lanthanum chromite-based perovskite-type oxide ($LaCrO_3$-based oxide) or a lanthanum strontium titanium-based perovskite-type oxide ($LaSrTiO_3$-based oxide). These materials have electrical conductivity, and are unlikely to be reduced and also unlikely to be oxidized even when brought into contact with a fuel gas such as a hydrogen-containing gas and an oxygen-containing gas such as air.

Figure 2A:
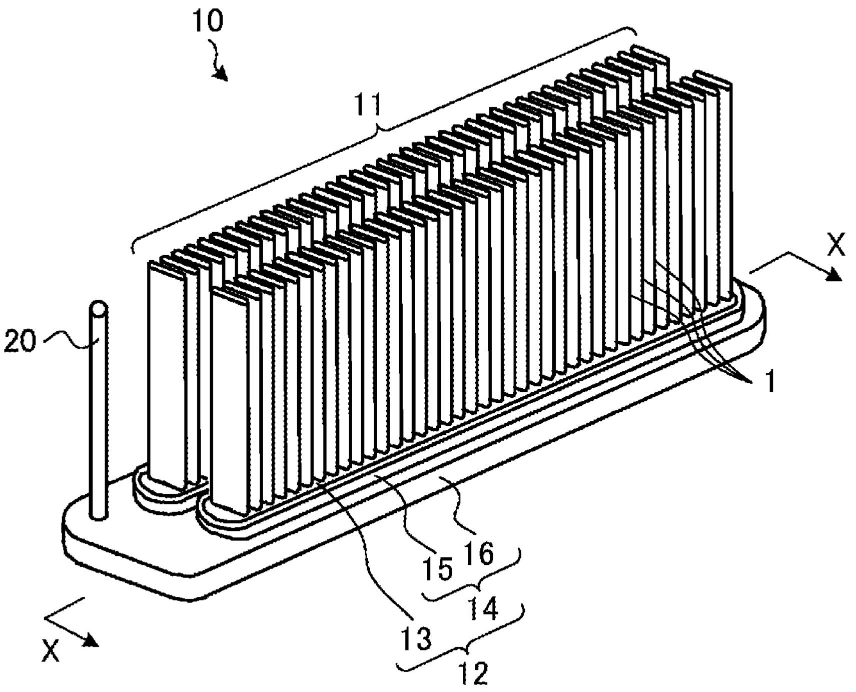
FIG. 2A is a perspective view illustrating an example of a cell stack device according to the first embodiment.

Configuration of Cell Stack Device Next, a cell stack device 10 according to the present embodiment using the cell 1 described above will be described with reference to FIGS. 2A to 2C. FIG. 2A is a perspective view illustrating an example of a cell stack device according to the first embodiment, FIG. 2B is a cross-sectional view taken along a line X-X illustrated in FIG. 2A, and FIG. 2C is a top view illustrating an example of the cell stack device according to the first embodiment.

As illustrated in FIG. 2A, the cell stack device 10 includes a cell stack 11 including a plurality of the cells 1 arrayed (stacked) in the thickness direction T (see FIG. 1A) of the cell 1, and a fixing member 12.

The fixing member 12 includes a fixing material 13 and a support member 14. The support member 14 supports the cells 1. The fixing material 13 fixes the cells 1 to the support member 14. Further, the support member 14 includes a support body 15 and a gas tank 16. The support body 15 and the gas tank 16, constituting the support member 14, are made of metal and electrically conductive.

Figure 2B:
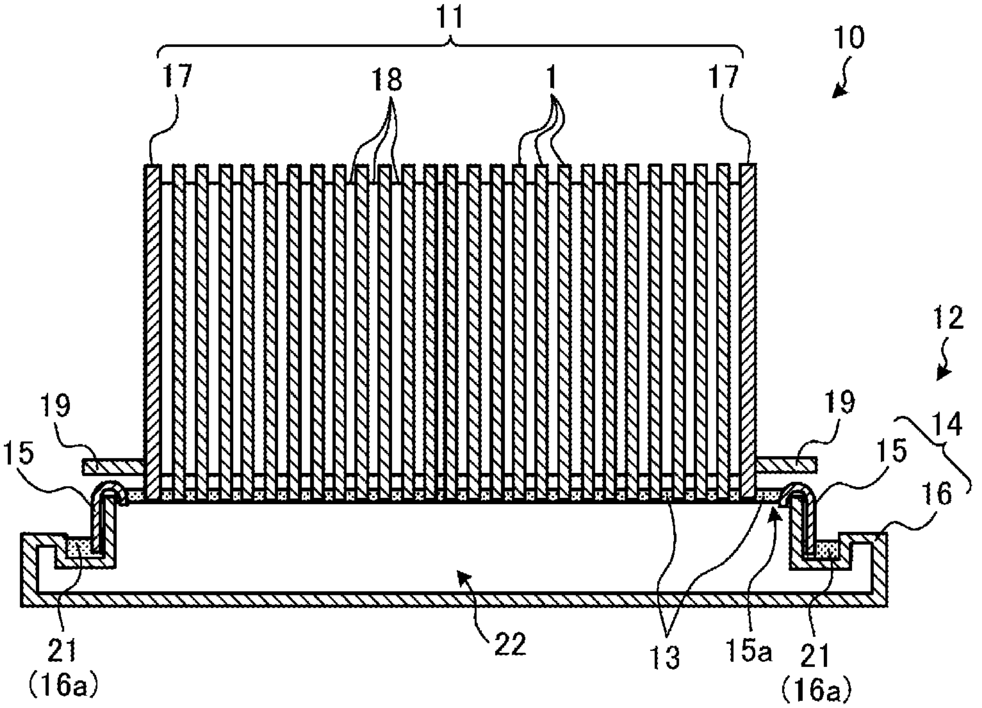
FIG. 2B is a cross-sectional view taken along the line X-X illustrated in FIG. 2A.
Figure 2C:
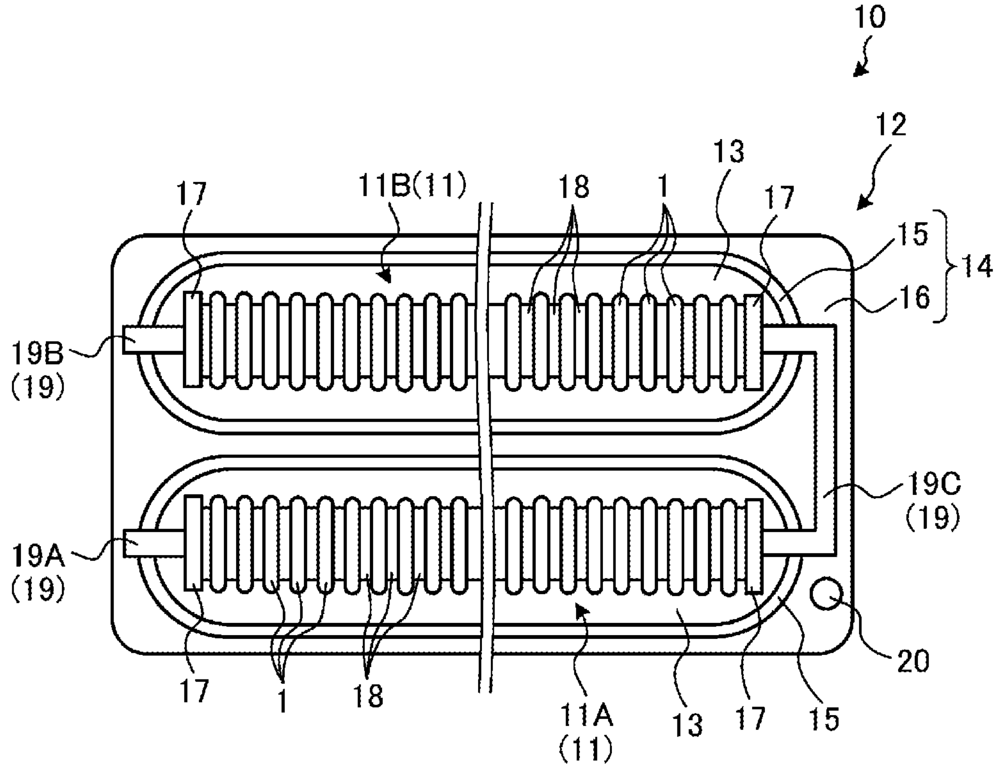
FIG. 2C is a top view illustrating the example of the cell stack device according to the first embodiment.

As illustrated in FIG. 2B, the support body 15 includes an insertion hole 15*a*, into which the lower end portions of the plurality of cells 1 are inserted. The lower end portions of the plurality of cells 1 and the inner wall of the insertion hole 15*a* are joined by the fixing material 13.

The gas tank 16 includes an opening portion through which a reactive gas is supplied to the plurality of cells 1 via the insertion hole 15*a*, and a recessed groove 16*a* located in the periphery of the opening portion. The outer peripheral end portion of the support body 15 is joined to the gas tank 16 by a bonding material 21, with which the recessed groove 16*a* of the gas tank 16 is filled.

In the example illustrated in FIG. 2A, the fuel gas is stored in an internal space 22 formed by the support body 15 and the gas tank 16. The support body 15 and the gas tank 16 constitute the support member 14. The gas tank 16 includes a gas circulation pipe 20 connected thereto. The fuel gas is supplied to the gas tank 16 through the gas circulation pipe and is supplied from the gas tank 16 to the gas-flow passages 2*a* (see FIG. 1A) inside the cells 1. The fuel gas supplied to the gas tank 16 is produced by a reformer 102 (see FIG. 4), which will be described later.

A hydrogen-rich fuel gas can be produced, for example, by steam-reforming a raw fuel. When the fuel gas is produced by the steam-reforming, the fuel gas contains steam. In the example illustrated in FIG. 2A, two rows of the cell stacks 11, two of the support bodies 15, and the gas tank 16 are provided. The two rows of the cell stacks 11 each have a plurality of cells 1. Each of the cell stacks 11 is fixed to a corresponding one of the support bodies 15. The gas tank 16 includes two through holes in an upper surface thereof. Each of the support bodies 15 is disposed in a corresponding one of the through holes. The internal space 22 is formed by the single gas tank 16 and the two support bodies 15.

The insertion hole 15*a* has, for example, an oval shape in a top surface view. The length of the insertion hole 15*a*, for example, in an array direction of the cells 1, that is, the thickness direction T thereof, is greater than the distance between two end current collectors 17 located at two ends of the cell stack 11. The width of the insertion hole 15*a* is, for example, greater than the length of the cell 1 in the width direction W (see FIG. 1A).

As illustrated in FIG. 2B, a bonding portion between the inner wall of the insertion hole 15*a* and the lower end portion of the cell 1 is filled with the fixing material 13 and solidified. As a result, the inner wall of the insertion hole 15*a* and the lower end portions of the plurality of cells 1 are bonded and fixed, and the lower end portions of the cells 1 are bonded and fixed to each other. Each of the cells 1 includes, at the lower end portion thereof, the gas-flow passages 2*a* communicating with the internal space 22 of the support member 14.

The fixing material 13 and the bonding material 21 may be of low electrical conductivity, such as glass. As the specific materials of the fixing material 13 and the bonding material 21, amorphous glass or the like may be used, and especially, crystallized glass or the like may be used.

As the crystallized glass, for example, any one selected from the group consisting of $SiO_2$—CaO-based, MgO—$B_2O_3$-based, $La_2O_3$—$B_2O_3$—MgO-based, $La_2O_3$—$B_2O_3$—ZnO-based, and $SiO_2$—CaO—ZnO-based materials may be used, or particularly, a $SiO_2$—MgO-based material may be used.

As illustrated in FIG. 2B, electrically conductive members 18 are each interposed between adjacent ones of the cells 1 of the plurality of cells 1. Each of the electrically conductive members 18 electrically connects in series one of the adjacent ones of the cells 1 to another one of the adjacent ones of the cells 1. More specifically, the electrically conductive member 18 connects the fuel electrode layer 5 of one of the cells 1 with the air electrode layer 8 of another one of the cells 1.

Further, as illustrated in FIG. 2B, the end current collectors 17 are electrically connected to the cells 1 located at the outermost sides in the array direction of the plurality of cells 1. The end current collectors 17 are each connected to an electrically conductive portion 19 protruding outward from the cell stack 11. The electrically conductive portion 19 collects electricity generated by the cells 1, and conducts the electricity to the outside. Note that in FIG. 2A, the end current collectors 17 are not illustrated.

Further, as illustrated in FIG. 2C, the cell stack device 10 may be one battery in which two cell stacks 11A and 11B are connected in series. In this case, the electrically conductive portion 19 of the cell stack device 10 may include a positive electrode terminal 19A, a negative electrode terminal 19B, and a connection terminal 19C.

The positive electrode terminal 19A functions as a positive electrode when the electrical power generated by the cell stack 11 is output to the outside, and is electrically connected to the end current collector 17 on a positive electrode side in the cell stack 11A. The negative electrode terminal 19B functions as a negative electrode when the electrical power generated by the cell stack 11 is output to the outside, and is electrically connected to the end current collector 17 on a negative electrode side in the cell stack 11B.

The connection terminal 19C electrically connects the end current collector 17 on a negative electrode side in the cell stack 11A and the end current collector 17 on a positive electrode side in the cell stack 11B.

Figure 3A:
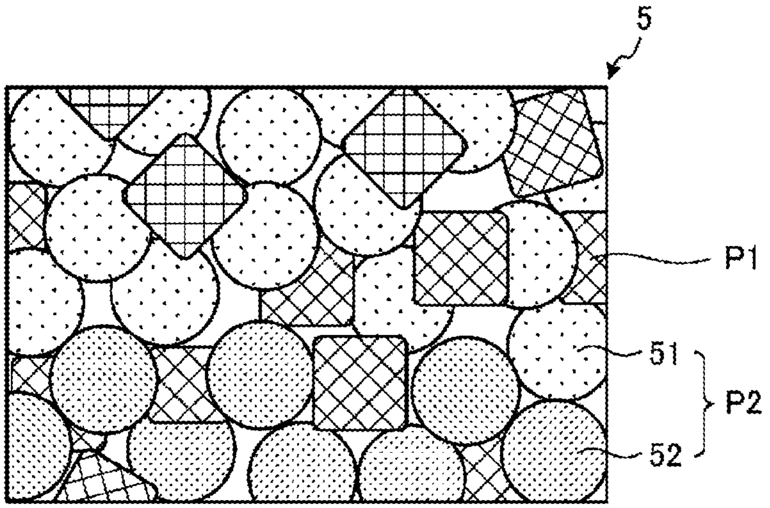
FIG. 3A is a diagram illustrating an example of an outline of a fuel electrode layer.

Details of Fuel Electrode Layer Details of the fuel electrode layer 5 according to the first embodiment will be described next with reference to FIGS. 3A and 3B. FIG. 3A is a diagram illustrating an example of an outline of the fuel electrode layer.

As illustrated in FIG. 3A, the fuel electrode layer 5 includes a first particle body P1 and a second particle body P2. The first particle body P1 has electron conductivity and catalysis. The first particle body P1 is, for example, Pt, Ni, or the like. The first particle body P1 is not limited to the particle body described above as long as the electrical conductivity thereof is $1.0\times10^5$ S/m or more at 0° C. The first particle body P1 has a particulate shape with an equivalent circle diameter average in a range from about 0.1 μm to about 10 μm in a cross-sectional view, for example. The first particle body P1 may contain an oxide therein as long as the surface thereof has electron conductivity and catalysis in the power generation state. The fuel electrode layer 5 in a non-power generation state may contain the first particle body P1 with the surface thereof oxidized.

The second particle body P2 is an oxide having ion conductivity and containing a rare earth element. The second particle body P2 has a particulate shape (first-order particle)

with an equivalent circle diameter average in a range from about 0.1 μm to about 2 μm in a cross-sectional view, for example. The second particle body P2 includes a first particle 51 containing a first rare earth element and a second particle 52 containing a second rare earth element different from the first rare earth element.

The locations of the first particle body P1 and the second particle body P2 (the first particle 51 and second particle 52) may be confirmed by observing a cross section of the fuel electrode layer 5 using an electron probe micro analyzer (EPMA). The equivalent circle diameter of each of the first particle body P1 and the second particle body P2 (the first particle 51 and second particle 52) may be calculated based on a result obtained by observing the cross section of the fuel electrode layer 5 using a scanning electron microscope (SEM).

The first particle 51 contains a rare earth element selected from the group consisting of, for example, Sc, Y, La, Nd, Sm, Gd, Dy, and Yb as the first rare earth element. The first particle 51 may contain a plurality of the first rare earth elements.

The second particle 52 contains the second rare earth element contained in the solid electrolyte layer 6. The second particle may contain a rare earth element selected from the group consisting of, for example, Nd, Sc, La, Gd, and Yb as the second rare earth element. The first particle 51 may contain a rare earth element that is not contained in the second particle 52 among Nd, Sc, La, Gd, and Yb.

The second particle 52 has ion conductivity higher than that of the first particle 51. The ion conductivity of each of the first particle 51 and the second particle 52 may be evaluated by, for example, preparing a rectangular sintered body having the composition of the first particle 51 and a rectangular sintered body having the composition of the second particle 52, and measuring the ion conductivity of each sintered body at 600° C. to 900° C. by a four-terminal method.

The first particle body P1 is uniformly distributed over the entire fuel electrode layer 5. On the other hand, in the second particle body P2, the first particle 51 and the second particle 52 are unevenly distributed inside the fuel electrode layer 5. This point will be further described with reference to FIGS. 3A and 3B.

Figure 3B:
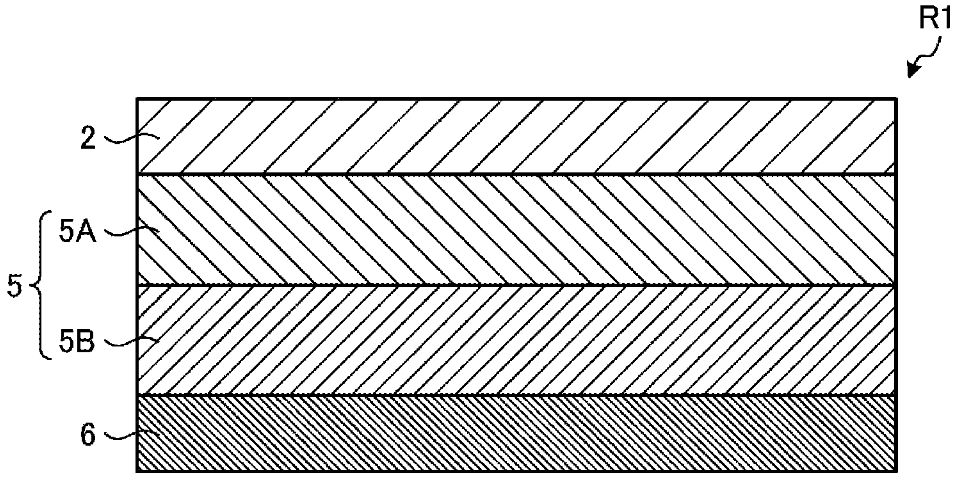
FIG. 3B is an enlarged cross-sectional view of a region R1 indicated in FIG. 1A.

FIG. 3B is an enlarged cross-sectional view of a region R1 indicated in FIG. 1A. As illustrated in FIG. 3B, the fuel electrode layer 5 includes a first site 5A and a second site 5B.

The first site 5A is located to be in contact with the support substrate 2. The second site 5B is located between the first site 5A and the solid electrolyte layer 6 and contains at least the second rare earth element. In the second site 5B, the content of the second rare earth element may be larger than the content of the first rare earth element. The contents of the first rare earth element and the second rare earth element in the second site 5B may be confirmed by, for example, elemental analysis using EPMA. Specifically, for example, the cross section of the element portion 3 in a layering direction is mirror-polished to bisect the fuel electrode layer 5 in the thickness direction, and a portion on the support substrate 2 side is defined as the first site 5A and a portion on the solid electrolyte layer 6 side is defined as the second site 5B. The content of each of the first rare earth element and the second rare earth element may be calculated by performing semi-quantitative analysis on each of the first rare earth element and the second rare earth element in a predetermined area of the cross section defined as the second site 5B. The area subjected to the elemental analysis may be, for example, an area of a quadrilateral with one side having a length equal to or less than the thickness of the second site 5B. The content of each rare earth element in the first site 5A described below may also be calculated in the same and/or a similar manner. The content of the first rare earth element or the second rare earth element is a molar ratio (atomic ratio) calculated by taking the total of elements excluding O (oxygen) among the elements contained in the second particle body P2, that is, contained in the ion conductive material as a denominator and taking the first rare earth element or the second rare earth element as a numerator. In a case where the distribution state of the first particle body P1 and the second particle body P2 is substantially uniform in the fuel electrode layer 5, the molar ratio (atomic ratio) calculated by taking the total of elements excluding O (oxygen) among the elements contained in the fuel electrode layer 5 as a denominator and taking the first rare earth element or the second rare earth element as a numerator, may be regarded as the content of the first rare earth element or the second rare earth element.

As described above, by including the second site 5B, in which the content of the second rare earth element is higher than that of the first rare earth element, the ion conductivity of the second site 5B located closer to the solid electrolyte layer 6 than the first site 5A may be increased. Due to this, since the actual resistance in the second site 5B can be reduced, the polarization resistance in the fuel electrode layer 5 is reduced. This can improve the battery performance of the cell 1.

The first site 5A may contain the same rare earth element as the rare earth element contained in the support substrate 2. When the first site 5A and the support substrate 2 contain the same rare earth element, the fuel electrode layer 5 is less likely to peel off from the support substrate 2. This can enhance the durability of the cell 1. By positioning the first site between the support substrate 2 and the second site 5B, for example, element diffusion from the support substrate 2 into the second site 5B can be suppressed, which makes it possible to make the ion conductivity of the second site 5B less likely to decrease.

The second site 5B may contain the same rare earth element as the rare earth element contained in the solid electrolyte layer 6. When the second site 5B and the solid electrolyte layer 6 contain the same rare earth element, the fuel electrode layer 5 is less likely to peel off from the solid electrolyte layer 6. This can enhance the durability of the cell 1.

The first site 5A and the second site 5B of the fuel electrode layer 5 may be distinguished from each other, for example, by taking a portion where the content of the second rare earth element is judged to be larger than the content of the first rare earth element by elemental analysis using the EPMA as the second site 5B and taking the remaining portion as the first site 5A. Specifically, for example, a cross section of the element portion 3 in the layering direction is mirror-polished, and each element is subjected to surface analysis or line analysis in the layering direction by the EPMA to obtain a concentration mapping or concentration profile of each element. From the obtained concentration mapping result or concentration profile result of each element, a region in which the first rare earth element is less than the second rare earth element in the fuel electrode layer 5 is taken as the second site and the other region is taken as the first site 5A.

The fuel electrode layer 5 may be positioned such that the content of the first rare earth element is larger in the first site 5A than in the second site 5B, for example. This makes it possible to suppress the deformation of the fuel electrode layer 5 because the coefficient of thermal expansion of the first site 5A can be made smaller than that of the second site 5B in some cases. This can enhance the durability of the cell 1. For example, the ion conductivity of $ZrO_2$ (8YbSZ) in which 8-mol % $Yb_2O_3$ is in solid solution is higher than the ion conductivity of $ZrO_2$ (8YSZ) in which 8-mol % $Y_2O_3$ is in solid solution. The coefficient of linear thermal expansion of a porous sintered body containing 50-vol % 8YSZ and 50-vol % Ni is 13.2 ppm at 1000° C., and the coefficient of linear thermal expansion of a porous sintered body containing 50-vol % 8YbSZ and 50-vol % Ni is 13.4 ppm at 1000° C. That is, the coefficient of linear thermal expansion of the sintered body containing YSZ is smaller than that of the sintered body containing YbSZ. When the first particle 51 is YSZ containing Y as the first rare earth element and the second particle 52 is YbSZ containing Yb as the second rare earth element to constitute the first site 5A and the second site 5B, respectively, the fuel electrode layer 5 may be constituted in such a manner that the ion conductivity of the second site 5B is high and the coefficient of linear thermal expansion of the first site 5A is small, thereby making it possible to realize the cell 1 having high battery performance and high durability.

The fuel electrode layer 5 may be positioned such that the ratio of the content of the first rare earth element to the sum of the contents of the first rare earth element and the second rare earth element ((content of first rare earth element)/((content of first rare earth element)+(content of second rare earth element))) is greater in the first site 5A than in the second site 5B. This makes it possible to suppress the deformation of the fuel electrode layer 5 because the coefficient of thermal expansion of the first site 5A can be made smaller than that of the second site 5B in some cases. This can enhance the durability of the cell 1.

Further, the fuel electrode layer 5 may be positioned such that the coefficient of linear thermal expansion of the first site 5A is smaller than that of the second site 5B. With this, the deformation of the fuel electrode layer 5 may be suppressed, and thus the durability of the cell 1 may be enhanced. The contents of the first rare earth element and the second rare earth element in the second site 5B may be confirmed by, for example, elemental analysis using the EPMA. Specifically, the contents of the first rare earth element and the second rare earth element may be measured by mirror-polishing a cross section of the element portion 3 in the layering direction and performing semi-quantitative analysis on each of the first rare earth element and the second rare earth element in a predetermined area of the cross section of the first site 5A. The area subjected to the elemental analysis may be, for example, an area of a quadrilateral with one side having a length equal to or less than the thickness of the first site 5A.

The fuel electrode layer 5 does not necessarily need to have the first site 5A and the second site 5B. For example, the content of the second rare earth element may change stepwise inside the fuel electrode layer 5. For example, when a surface of the fuel electrode layer 5 in contact with the solid electrolyte layer 6 is referred to as a first surface and a surface thereof located on the opposite side to the solid electrolyte layer 6 is referred to as a second surface, the content of the second rare earth element in the fuel electrode layer 5 may gradually decrease from the first surface toward the second surface. As described above, when the content of the second rare earth element gradually decreases from the first surface toward the second surface, the ion conductivity of the fuel electrode layer 5 at a position closer to the solid electrolyte layer 6 may be made higher than that of the fuel electrode layer 5 at a position farther from the solid electrolyte layer 6. Due to this, since the actual resistance in the fuel electrode layer 5 at a position closer to the solid electrolyte layer 6 can be reduced, the polarization resistance in the fuel electrode layer 5 is reduced. This can improve the battery performance of the cell 1.

Figure 4:
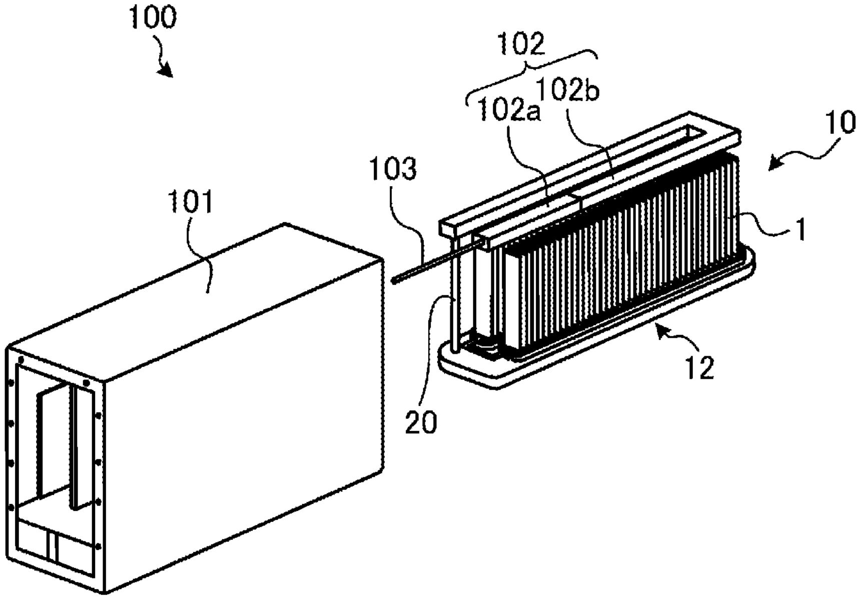
FIG. 4 is an exterior perspective view illustrating an example of a module according to the first embodiment.

Module A module 100 according to an embodiment of the present disclosure using the cell stack device 10 described above will be described next with reference to FIG. 4. FIG. 4 is an exterior perspective view illustrating a module according to the first embodiment. FIG. 4 illustrates a state in which the front and rear surfaces that are part of a storage container 101 are removed, and the cell stack device 10 of a fuel cell housed in the container is taken out rearward.

As illustrated in FIG. 4, the module 100 includes the storage container 101, and the cell stack device 10 housed in the storage container 101. The reformer 102 is disposed above the cell stack device 10.

The reformer 102 generates a fuel gas by reforming a raw fuel such as natural gas and kerosene, and supplies the fuel gas to the cell 1. The raw fuel is supplied to the reformer 102 through a raw fuel supply pipe 103. The reformer 102 may include a vaporizing unit 102*a* for vaporizing water and a reforming unit 102*b*. The reforming unit 102*b* includes a reforming catalyst (not illustrated) for reforming the raw fuel into a fuel gas. Such a reformer 102 can perform steam reforming, which is a highly efficient reforming reaction.

Then, the fuel gas generated by the reformer 102 is supplied to the gas-flow passage 2*a* (see FIG. 1A) of the cell 1 through the gas circulation pipe 20, the gas tank 16, and the support member 14.

In the module 100 having the configuration mentioned above, the temperature in the module 100 during normal power generation is about from 500° C. to 1000° C. due to combustion of gas and power generation by the cell 1.

The above-discussed module 100 is configured such that the cell stack device 10 with improved battery performance is housed therein as described above, whereby the module 100 with the improved battery performance may be realized.

Figure 5:
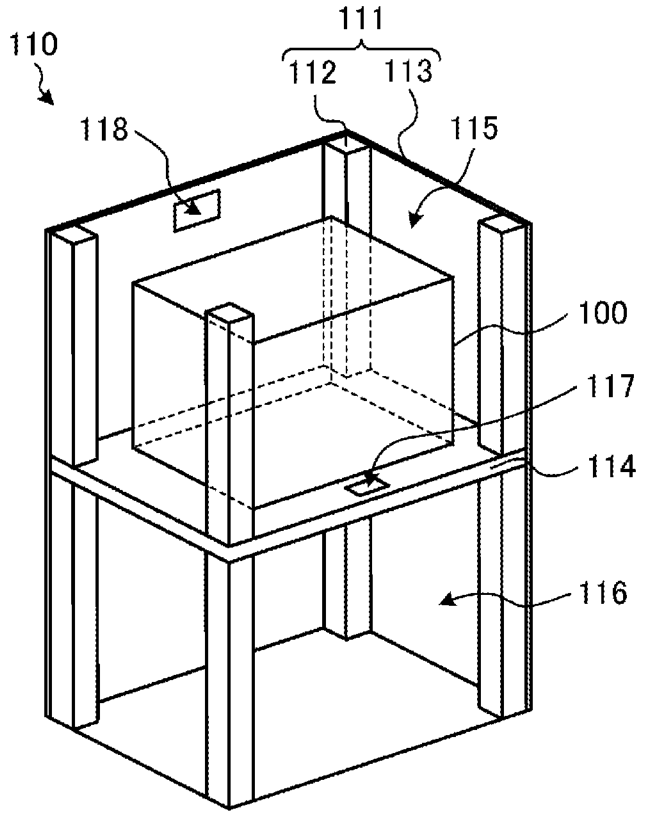
FIG. 5 is an exploded perspective view schematically illustrating an example of a module housing device according to the first embodiment.

Module Housing Device FIG. 5 is an exploded perspective view illustrating an example of a module housing device according to the first embodiment. A module housing device 110 according to the present embodiment includes an external case 111, the module 100 illustrated in FIG. 4, and an auxiliary device (not illustrated). The auxiliary device operates the module 100. The module 100 and the auxiliary device are housed in the external case 111. Note that in FIG. 5, the configuration is partially omitted.

The external case 111 of the module housing device 110 illustrated in FIG. 5 includes a support 112 and an external plate 113. A dividing plate 114 vertically partitions the interior of the external case 111. The space above the dividing plate 114 in the external case 111 is a module housing room 115 for housing the module 100. The space below the dividing plate 114 in the external case 111 is an auxiliary device housing room 116 for housing the auxiliary device that operates the module 100. Note that in FIG. 5, the auxiliary device housed in the auxiliary device housing room 116 is omitted.

The dividing plate 114 includes an air circulation hole 117 for causing air in the auxiliary device housing room 116 to flow into the module housing room 115 side. The external plate 113 constituting the module housing room 115 includes an exhaust hole 118 for discharging air inside the module housing room 115.

In the module housing device 110 discussed above, the module 100 with improved battery performance is provided in the module housing room 115 as described above, whereby the module housing device 110 with the improved battery performance may be realized.

In the embodiment mentioned above, the case where the support substrate having the hollow flat plate shape is used has been exemplified; however, the embodiment can also be applied to a cell stack device using a cylindrical support substrate.

Second Embodiment

Next, a cell and a cell stack device according to a second embodiment will be described with reference to FIG. 6 to FIG. 9.

In the embodiment described above, a so-called "vertically striped" cell stack device, in which only one element portion including a fuel electrode layer, a solid electrolyte layer, and an air electrode layer is provided on the surface of a support substrate, is exemplified. However, the present disclosure may be applied to a horizontally striped cell stack device with an array of so-called "horizontally striped" cells, in which element portions are provided on the surface of a support substrate at mutually separated locations, and adjacent element portions are electrically connected to each other.

Figure 6:
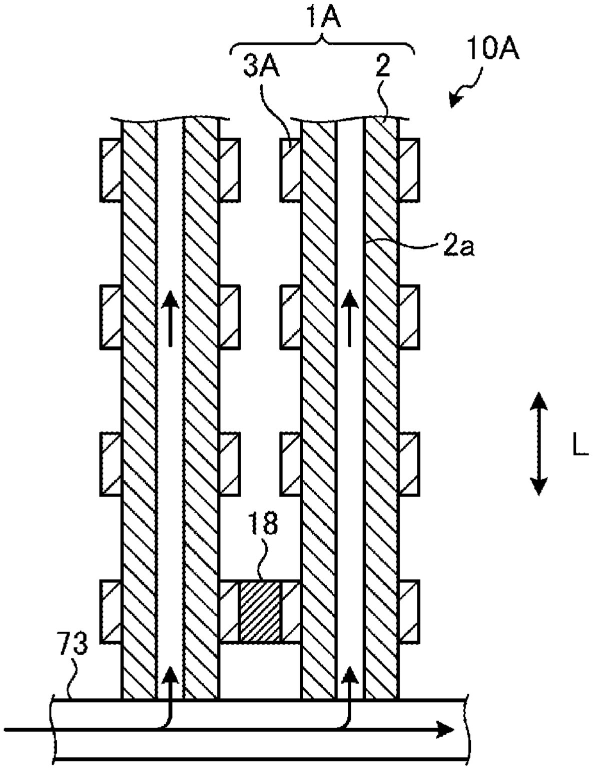
FIG. 6 is a cross-sectional view schematically illustrating a cell according to a second embodiment.

FIG. 6 is a cross-sectional view schematically illustrating a cell according to the second embodiment. As illustrated in FIG. 6, a cell stack device 10A includes a plurality of cells 1A extending in the length direction L from a pipe 73 configured to distribute a fuel gas. The cell 1A includes a plurality of element portions 3 on a support substrate 2. A gas-flow passage 2*a*, through which a gas from the pipe 73 flows, is provided inside the support substrate 2. The element portions 3 on the support substrate 2 are electrically connected by a connection layer 8A, which will be described later. The plurality of cells 1A are electrically connected to each other via electrically conductive members 18. The electrically conductive members 18 are each located between the element portions 3 each included in a corresponding one of the cells 1A and electrically connect adjacent ones of the cells 1A to each other.

Figure 7:
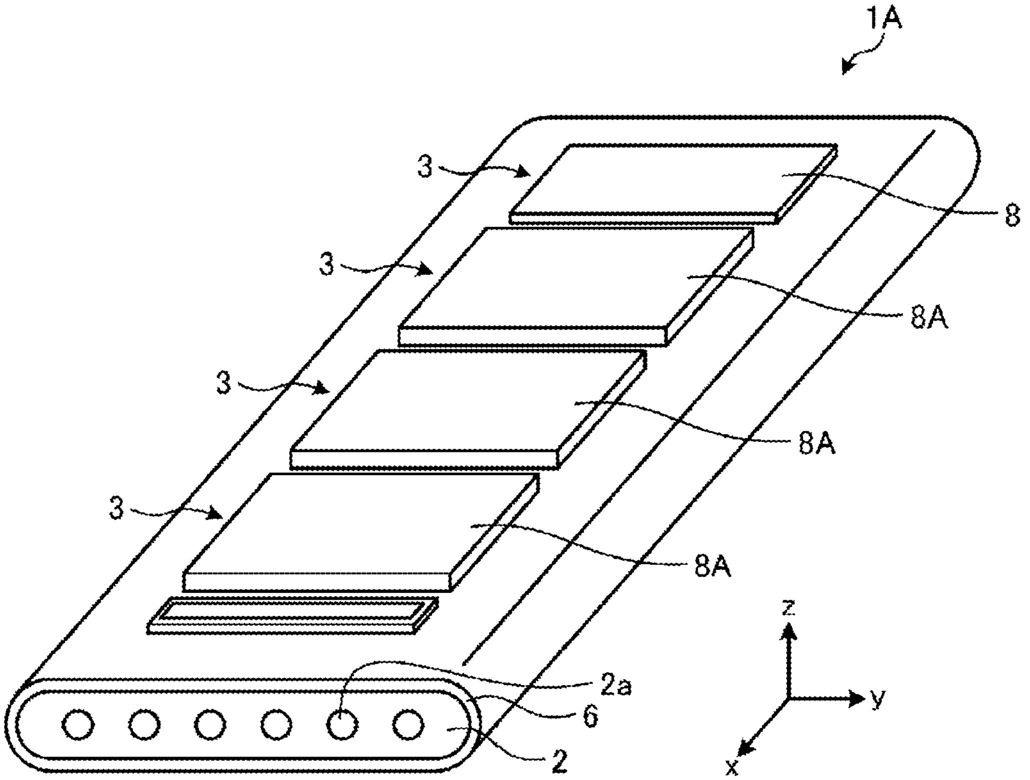
FIG. 7 is a perspective view illustrating an example of the cell according to the second embodiment.
Figure 8:
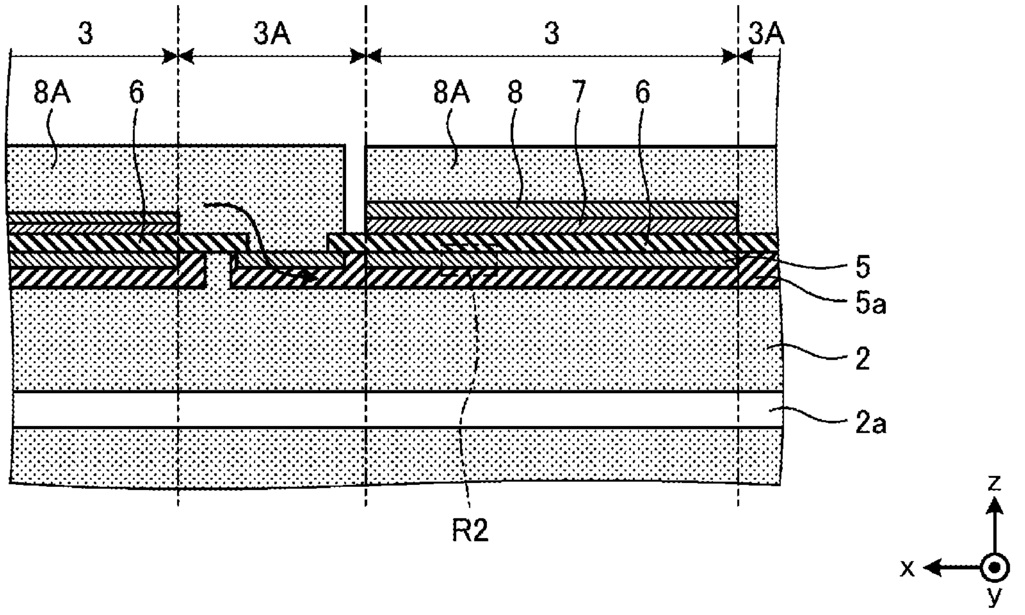
FIG. 8 is a partial cross-sectional view of the cell illustrated in FIG. 7.

FIG. 7 is a perspective view illustrating an example of the cell according to the second embodiment. FIG. 8 is a cross-sectional view illustrating the example of the cell according to the second embodiment. In the cell 1A, the element portions 3 and connecting portions 3A are alternately located in an X axis direction.

The cell 1A has a shape that is vertically symmetric with respect to a plane that passes through a center in the thickness direction (Z axis direction) and is parallel to a main surface of the support substrate 2.

The element portion 3 includes a fuel electrode layer 5, a solid electrolyte layer 6, an intermediate layer 7, and an air electrode layer 8 layered in that order. The connection layer 8A for electrically connecting the element portions 3 adjacent to each other in the X axis direction is located on the surface of the air electrode layer 8. A fuel electrode current collector 5*a* having electron conductivity is located on the surface of the fuel electrode layer 5.

Figure 9:
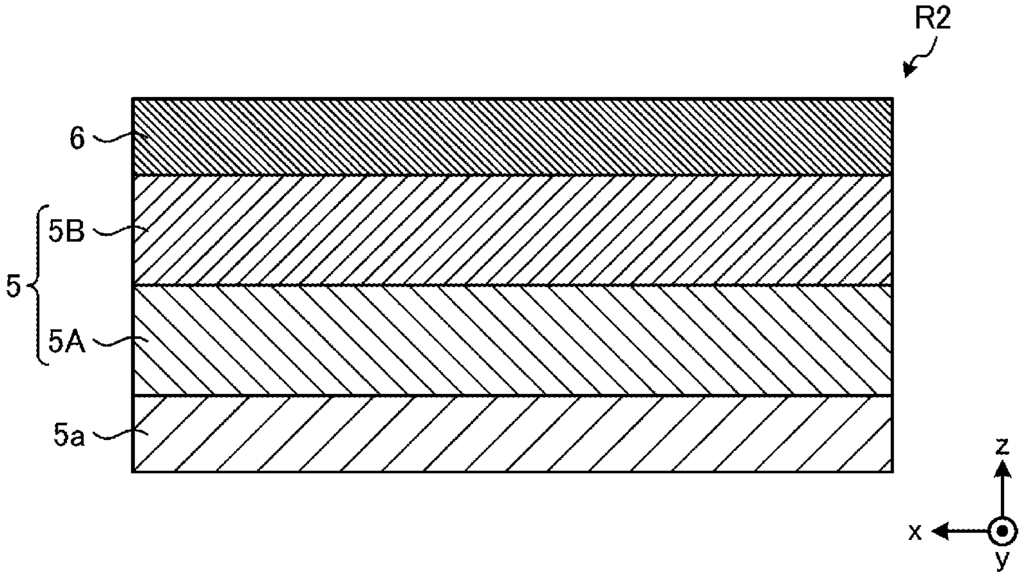
FIG. 9 is an enlarged cross-sectional view of a region R2 indicated in FIG. 8.

FIG. 9 is an enlarged cross-sectional view of a region R2 indicated in FIG. 8. As illustrated in FIG. 9, the fuel electrode layer 5 includes a second site 5B and a first site 5A located in sequence from the solid electrolyte layer 6 side. The second site 5B contains at least a second rare earth element.

The solid electrolyte layer 6 contains a second rare earth element. In the second site the content of the second rare earth element may be larger than the content of a first rare earth element. With this, the ion conductivity of the second site 5B located closer to the solid electrolyte layer 6 than the first site 5A may be increased. Due to this, since the actual resistance in the second site 5B can be reduced, the polarization resistance in the fuel electrode layer 5 is reduced. This can improve the battery performance of the cell 1A.

Third Embodiment

Figure 10A:
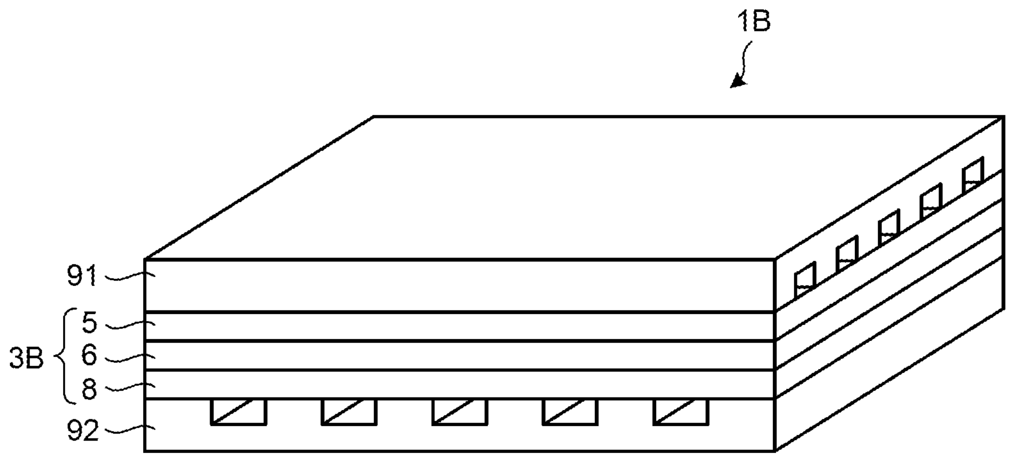
FIG. 10A is a perspective view illustrating an example of a cell according to a third embodiment.
Figure 10B:
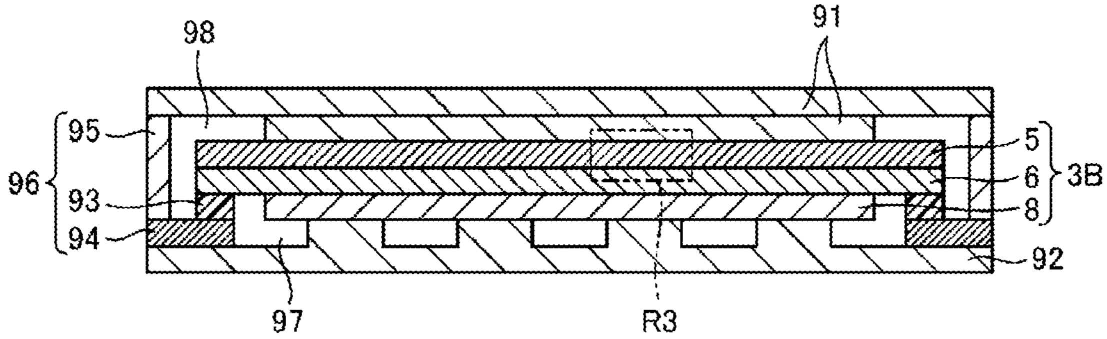
FIG. 10B is a partial cross-sectional view of the cell illustrated in FIG. 10A.

FIG. 10A is a perspective view illustrating an example of a cell according to a third embodiment. FIG. 10B is a partial cross-sectional view of the cell illustrated in FIG. 10A.

As illustrated in FIG. 10A, a cell 1B includes an element portion 3B, in which a fuel electrode layer 5, a solid electrolyte layer 6, and an air electrode layer 8 are layered. The element portion 3B is a site in which the solid electrolyte layer 6 is sandwiched between the fuel electrode layer 5 and the air electrode layer 8. In a cell stack device in which a plurality of flat plate cells are layered, for example, a plurality of the cells 1B are electrically connected by electrically conductive members 91 and 92, which are metal layers each adjacent to the cells 1B. The electrically conductive members 91 and 92 electrically connect the adjacent cells 1B and each include a gas-flow passage for supplying gas to the fuel electrode layer 5 or the air electrode layer 8.

As illustrated in FIG. 10B, there is provided a sealing material for hermetically sealing a flow passage 98 of a fuel gas and a flow passage 97 of an oxygen-containing gas of the flat plate cell stack. The sealing material is a fixing member 96 of the cell 1B, and includes a bonding material 93 and support members 94 and 95, which constitute a frame. The bonding material 93 may be glass, or may be a metal material such as silver solder.

The support member 94 may be a so-called separator that separates the flow passage 98 of the fuel gas and the flow passage 97 of the oxygen-containing gas. The material of the support members 94 and 95 may be, for example, an electrically conductive metal, or may be an insulating ceramic. When the bonding material 93 is, for example, insulating glass, both the support members 94 and 95 may be metal, or one of the support members 94 and 95 may be an insulating material. When the bonding material 93 is an electrically conductive metal, both or one of the support members 94 and 95 may be an insulating material. When the support members 94 and 95 are metal, the support members 94 and 95 may be formed integrally with the electrically conductive member 92.

One of the bonding material 93 and the support members 94 and 95 has insulating properties, and causes the two electrically conductive members 91 and 92 sandwiching the flat plate cell to be electrically insulated from each other.

Figure 10C:
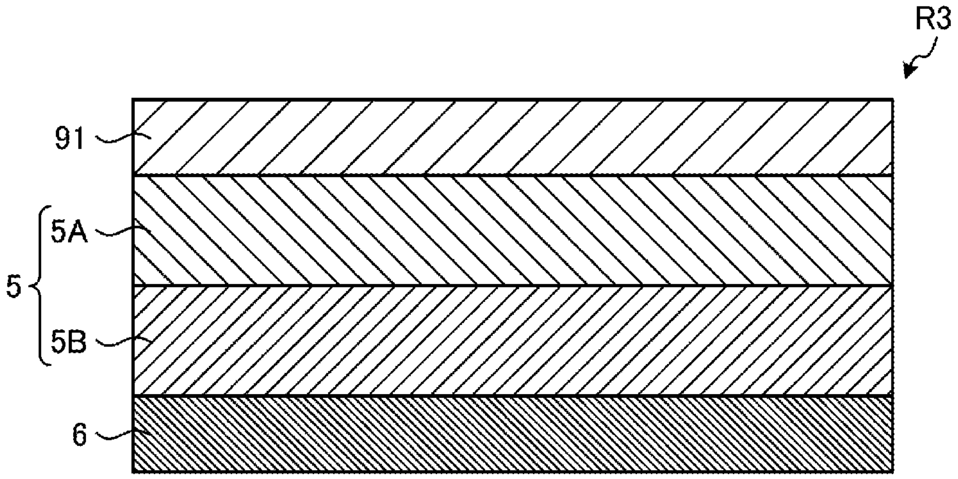
FIG. 10C is an enlarged cross-sectional view of a region R3 indicated in FIG. 10B.

FIG. 10C is an enlarged cross-sectional view of a region R3 indicated in FIG. 10B. As illustrated in FIG. 10C, the fuel electrode layer 5 includes a second site 5B and a first site located in sequence from the solid electrolyte layer 6 side. The second site 5B contains at least a second rare earth element.

The solid electrolyte layer 6 contains a second rare earth element. In the second site the content of the second rare earth element may be larger than the content of a first rare earth element. With this, the ion conductivity of the second site 5B located closer to the solid electrolyte layer 6 than the first site 5A may be increased. Due to this, since the actual resistance in the second site 5B can be reduced, the polarization resistance in the fuel electrode layer 5 is reduced. This can improve the battery performance of the cell 1B.

Other Variations Subsequently, a cell stack device according to other variations of the embodiments will be described.

In the above embodiments, a fuel cell, a fuel cell stack device, a fuel cell module, and a fuel cell device are illustrated as examples of the "cell", the "cell stack device", the "module", and the "module housing device"; they may also be an electrolytic cell, an electrolytic cell stack device, an electrolytic module, and an electrolytic device, respectively, as other examples.

While the present disclosure has been described in detail, the present disclosure is not limited to the aforementioned embodiment, and various changes, improvements, and the like can be made without departing from the gist of the present disclosure.

As described above, the cell 1 according to the embodiment includes the air electrode layer 8, the fuel electrode layer 5, and the solid electrolyte layer 6. The fuel electrode layer 5 contains a first rare earth element and a second rare earth element different from the first rare earth element. The solid electrolyte layer 6 is located between the air electrode layer 8 and the fuel electrode layer 5, and contains the second rare earth element. The fuel electrode layer 5 has the first site 5A and the second site 5B. The second site 5B is located between the first site 5A and the solid electrolyte layer 6, and contains at least the second rare earth element. This can improve the battery performance of the cell 1.

The cell stack device 10 according to the embodiment includes the cell stack 11 provided with at least one of the cells 1 described above. As a result, the cell stack device 10 with improved battery performance may be realized.

Further, the module 100 according to the embodiment includes the cell stack device described above, and the storage container 101 configured to house the cell stack device 10. As a result, the module 100 with improved battery performance may be realized.

Further, the module housing device 110 according to the embodiment includes the module 100 described above, the auxiliary device for operating the module 100, and the external case that houses the module 100 and the auxiliary device. Thus, the module housing device 110 with improved battery performance may be realized.

Note that the embodiments disclosed herein are exemplary in all respects and not restrictive. The aforementioned embodiments can be embodied in a variety of forms. The aforementioned embodiments may be omitted, replaced, or changed in various forms without departing from the scope of the appended claims and the purpose thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell comprising:

a support substrate; and a fuel electrode layer containing a first rare earth element and a second rare earth element, which is different from the first rare earth element, wherein the fuel electrode layer comprises a first site located on the support substrate, and a second site located on the first site, the second site containing at least the second rare earth element, and the support substrate, the first site, and the second site each containing a first particle body having electron conductivity and catalytic action.

2. The cell according to claim 1, wherein in the second site, a content of the second rare earth element is larger than a content of the first rare earth element.

3. The cell according to claim 1, wherein the first site containing the second rare earth element, and a content of the second rare earth element in the second site is larger than a content of the second rare earth element in the first site.

4. The cell according to claim 1, wherein the fuel electrode layer contains a second particle body having ion conductivity, and the second particle body comprises a first particle containing the first rare earth element and a second particle containing the second rare earth element.

5. The cell according to claim 4, wherein an ion conductivity of the second particle is higher than an ion conductivity of the first particle.

6. The cell according to claim 1, wherein a content of the first rare earth element in the first site is larger than a content of the first rare earth element in the second site.

7. The cell according to claim 1, wherein a ratio of a content of the first rare earth element to a sum of contents of the first rare earth element and the second rare earth element is larger in the first site than in the second site.

8. The cell according to claim 1, wherein a solid electrolyte layer located on the second site, the solid electrolyte layer containing Ce.

9. A cell stack device, comprising:

a cell stack provided with at least one cell according to claim 1.

10. A module comprising:

the cell stack device according to claim 9; and a storage container configured to house the cell stack device.

11. A module housing device, comprising:

the module according to claim 10;

an auxiliary device configured to operate the module; and an external case configured to house the module and the auxiliary device.

12. A cell comprising:

a support substrate; and a fuel electrode layer containing a first rare earth element and a second rare earth element, which is different from the first rare earth element, wherein the fuel electrode layer comprises a first site located on the support substrate, and a second site located on the first site, the second site containing at least the second rare earth element, and the support substrate, the first site, and the second site each containing a first particle body having electron conductivity and catalytic action, wherein the first site containing the second rare earth element, and a content of the second rare earth element in the second site is larger than a content of the second rare earth element in the first site, a solid electrolyte layer located on the second site, the solid electrolyte layer containing Ce.

* * * * *